United States Patent [19]

Bauer

[11] Patent Number: 5,227,104
[45] Date of Patent: Jul. 13, 1993

[54] HIGH SOLIDS CONTENT GELS AND A PROCESS FOR PRODUCING THEM

[75] Inventor: Ralph Bauer, Niagara Falls, Canada

[73] Assignee: Norton Company, Worcester, Mass.

[21] Appl. No.: 658,418

[22] Filed: Feb. 26, 1991

Related U.S. Application Data

[63] Continuation of Ser. No. 323,268, Mar. 15, 1989, abandoned, which is a continuation of Ser. No. 732,973, May 13, 1985, abandoned, which is a continuation-in-part of Ser. No. 620,654, Jun. 14, 1984, abandoned.

[51] Int. Cl.$^5$ ............................................. C04B 35/10
[52] U.S. Cl. ........................................ 264/56; 51/309; 501/12; 501/153
[58] Field of Search .................... 264/56; 501/12, 153; 51/309

[56] References Cited

U.S. PATENT DOCUMENTS

| | | |
|---|---|---|
| 3,108,888 | 10/1963 | Bugosh . |
| 3,808,015 | 4/1974 | Seufert .................................. 106/65 |
| 3,853,688 | 12/1974 | D'Ambrosio ........................ 161/178 |
| 3,953,561 | 4/1976 | Shin ........................................ 264/57 |
| 4,314,827 | 2/1982 | Leitheiser et al. ..................... 51/298 |
| 4,379,134 | 4/1983 | Weber et al. . |
| 4,623,364 | 11/1986 | Cottringer et al. ................... 51/309 |

FOREIGN PATENT DOCUMENTS 2099012 12/1982 United Kingdom .

OTHER PUBLICATIONS

"Enhanced Densification of Boehmite Sol-Gels by α-Alumina Seeding", by Kumagai, pp. C-230/1, Nov. 1984.

Blakelock et al.—"The Production and Properties of Polycrystalline Alumina Rods and Fibres", In British Ceramic Soc., No. 15, Jan. 1970, pp. 69-83.

*Primary Examiner*—James Derrington
*Attorney, Agent, or Firm*—Weil, Gotshal & Manges

[57] ABSTRACT

A method is described for producing hard, dense, finely crystalline fired bodies from alumina gels of solids content greater than 45%, by the use of high pressure in mixing and/or presssure extrusion together with seeding of the gel by submicron alpha alumina particles.

16 Claims, No Drawings

HIGH SOLIDS CONTENT GELS AND A PROCESS FOR PRODUCING THEM

This is a continuation of copending application Ser. No. 07/323,268 filed on Mar. 15, 1989, now abandoned which is a continuation of application Ser. No. 06/732,973 filed May 13, 1985 now abandoned, which in turn is a continuation-in-part of application Ser. No. 06/620,654 filed Jun. 14, 1984 (now abandoned).

BACKGROUND OF THE INVENTION

In the manufacture of so called sol-gel aluminum oxide ceramic articles and in particular aluminous abrasive grain, large volumes of water have been used to form the gels. These large volumes have been made necessary basically for 3 (three) reasons:

1. The prior art teaches that gels, particularly for abrasive purposes, made from gelable alumina powders should contain high levels (3-7 weight percent) of MgO. The MgO is introduced into the sol-gel as a solution of a magnesium salt. Such introduction of salt solutions dramatically increases the viscosity of the system. Therefore, to ensure good homogeneous mixing of the magnesium salt with the alumina gel it is necessary to work with a relatively dilute sol-gel so that upon addition of the magnesium salt the viscosity remains low enough so that efficient and good mixing remain possible. For conventional abrasive manufacture containing around 5% MgO, a solids content in the 15-25 weight % range may be conveniently worked with but becomes very tedious beyond that. See, for example, U.S. Pat. No. 4,314,827 and published British application 2,099,012A.
2. The manufacture of gels from present commercially derived alumina monohydrate powders requires that some acid (e.g., nitric or formic) be added to the powder to allow the colloidal particles to disperse. In order to ensure that the acid can interact with all of the powder, the acid is diluted with a large volume of water and conventionally mixed in a high shear blender or other convenient mixer. If insufficient water is used, the gel becomes too viscous to homogeneously mix in the magnesia (as above) and also it is extremely difficult to gel agglomerates of unpeptized alumina powder. With conventional mixing it becomes very very tedious to ensure a homogeneous peptization beyond about 45 weight % solids content. Solids content referes only to alumina monohydrate content in the sol gel and neglects the magnesia salt.
3. Relatively large volumes of solvent (almost always water but could be a mixture of methanl-water or many other possibilities) are required in conventional gel preparation in order to ensure proper formation of the gel so that a coherent glassy dried green form is obtained. If insufficient water (solvent) is present the resulting green-ware is not coherent and tends to crumble easily, not at all exhibiting the glassy like features of the high water containing gel. When these poorer quality green bodies are sintered, the product tends to have weak zones and "pock marked" surfaces. This becomes especially noticeable beyond about 50 weight % solids.

The presence of large volumes of water has several major disadvantages:

1. energy cost to remove the water is extremely high because conventional dewatering such as filtration is difficult if not impossible once the gel is formed,
2. large capital investments are needed to provide large scale dewatering equipment,
3. volumes handled are large, and
4. control of shrinkage and cracking during drying is extremely difficult.

In view of the drawbacks of these conventional low solids content gels, I was led to investigate means whereby high quality ceramic articles, particularly abrasive grain could be made at high solids (greater than 30%) levels. Thus an object of the invention is to produce a high solids content aluminum oxide based gel system which will as a result have much improved economics of drying (dewatering) and permit much more control of greenware shrinkage and cracking during drying.

DETAILED DESCRIPTION OF THE INVENTION

Copending U.S. application Ser. No. 06/592,689, filed Mar. 23, 1984, now abandoned, along with its continuation-in-part U.S. application Ser. No. 662,869 filed Oct. 19, 1984, now U.S. Pat. No. 4,623,364, and its copending further continuation-in-part U.S. application Ser. No. 023,346 filed Mar. 9, 1987, teaches that high quality abrasive grain may be formed from a gel without the use of high levels of MgO. Rather than requiring the MgO as sintering aid/grain growth inhibitor, it has been found that an addition of extremely fine $Al_2O_3$ will allow the gel to sinter to greater than 90% theoretical density in only a few minutes and thereby still retain a submicron microstructure.

Such a "seeded" ceramic abrasive material has been found to perform much better than the MgO containing "unseeded" gel in many grinding applications. The MgO may still be added to the "seeded" gel but generally does not improve performance any further and is often deleterious.

By eliminating magnesium salt additions then, I have effectively removed the first reason cited earlier for high water requirements, and the solids content can be increased by a factor of 2-3 times.

In order to insure complete peptization of the alumina (i.e. contact with acid), and to also insure "polymerization" i.e. contact with water, I resorted to using a high solids kneader/mixer and subsequent extrusion of the mix with either a piston or auger type extruder. It was felt that the pressure exerted on the mixed paste/gel would force the liquids (acid and water) into any remaining ungelled alumina powder compacts and provide a homogeneous gelled product. When the solids content was from 45-65 weight % it was found that pressures from 200 psi to 20 tons/square inch worked satisfactorily with the preferred pressured at 300 psi to 10 tons/square inch. Presumably, given a mixer with the combined features of mixing and exerting such pressures, the extrusion step could be omitted unless, of course, shape control was desired.

The problem of unpeptized material, typically in the amount of a few percent is recognized even in the case of dilute sol-gel dispersions, as indicated in U.S. Pat. No. 4,314,827, where the use of a centrifuge is disclosed to eliminate such material. In the case of the high solids sol-gel dispersions of the present invention, removal of unpeptized material cannot be practically done by centrifuging. However, such material can be made peptizable by subjecting the mix to hydrothermal treatment e.g. 180° C. for 2 hours at autogenous pressure. Such treatment may or may not be needed depending upon the quality of the alumina monohydrate powder and the tolerable amount of unpeptized material in the product.

EXAMPLE I

Illustrates sintering enhancement by using "seeded" gel, preparation of high solids content gel and effects of extrusion.

In a Maternini mixer was put 8 kg Condea Pural SB alumina monohydrate, 9.5 kg of alumina gel (Condea base) at 20.7% solids which had been "seeded" with 10 g ultra fine (submicron) $Al_2O_3$ generated from wear on Sweco mill (vibratory mill) alumina grinding media, and 400 ml concentrated nitric acid. The 56% solids paste which formed was very difficult to mix thoroughly and many sections of unreacted powder were visible. A sample of this paste was dried and sintered at 1400° C. for 10 minutes; the specimen showed a Vickers hardness of 16.5 GPa but many large pores and pits were visible. The remainder of the sample was extruded in a verticle piston extruder through a 1/16" die plate at a pressure of 13-15 tons per square inch and 27 inches of vacuum. The extrudate which was very pasty and crumbly going in, emerged as translucent/transparent fibres, quite homogeneous and relatively flaw free. The extrudate after sintering as described above had only a few small pores and uniform hardness of 16.5 GPa.

The extrudate, therefore, had hardness (density) equivalent to non-seeded MgO containing gels suitable for use as a superior abrasive. The extrudate fibres dried essentially intact although some cracking was observed. Nonetheless, shrinkage and cracking control were much improved over the conventional 15-25%, gels and drying rates were increased dramatically.

EXAMPLE II

Illustrates preparation of high solids (50%) Gel extrusion and sintering to 97% theoretical density.

In a mix-muller were mixed 40 pounds Condea Pural SB monohydrate alumina powder, 11 pounds of Sweco milled water (66½ hours milling with ½×½ cylindrical, 90% alumina, grinding media) which contained 2.266% solids, 14 pounds of tap water was added and the whole mixed. A mixture of 1600 ml concentrated nitric acid and 1600 ml tap water was then added the whole mixed for 2 minutes. Then 6 pounds more of tap water was added. The whole was mixed 2 minutes more and then piston extruded through ⅛" holes at 500-1000 pounds per square inch pressure. The mixed material as in the previous example did not seem to be homogeneously gelled and was somewhat granular. After extrusion the material appeared to be much more uniformly and homogeneously gelled. The extrudate after sintering at 1400° C. for 5 minutes had Vickers hardness of 19.5-20 GPa.

The aluminous bodies made by the process of the present invention may contain spinel formers such as alumina, modifying agents such as titania, and may serve as matrixes or boding agents for other ceramic materials. By solids contents I mean 100% times the ratio of the weight of the alumina hydrate to the sum of the weight of the solid alumina hydrate starting material and the weight of added liquid. My invention comprehends a solids content of from 45% to as high as 75%. It should be noted that although the alumina (boehmite) starting materials are termed "monohydrates" they may in fact contain more or less than one mole of $H_2O$ per calculated mole of $Al_2O_3$.

By "seed material" I mean submicron sized alpha alumina particles or equivalent nucleation centers which produce a non-cellular submicron structures in the alumina bodies when fired for 10 minutes or less at 1400° C.

The optimum amount of submicron seed material (contained in the "milled water" in the above example) is 1% solids based on the total solids of the mixture. No more than 5% of such seed material should be added since at such levels above the optimum it tends to increase the crystal size of the fired product and reduces the hardness of the product. The minimum, as evidenced by Example I, is about 0.1% by weight of the hydrated alumina solids content of the mixture.

In all of the products of this invention, as in the above example, the fired crystal size of the alpha alumina body, (or matrix material when serving as a bonding agent) should be less than one micron.

The preferred firing temperature is 1400° C. or less, and in no event should be over 1500° C. to retain the required submicron crystal size of the product.

Hardnesses herein were measured by a Vickers diamond indenter point at a load of 500 grams.

The high solids gels of this invention may be shaped by extrusion or molded to produce wear resistant parts, parts designed for use in corrosive or high temperature environments, substrates for electronic applications, and any other applications where strong and dense alpha alumina bodies are required.

Where abrasive grits are desired, extruded rods of appropriate size may be formed then dried and crushed or broken up to the desired grit shapes prior to firing.

The gels of the present invention may also be used to form coatings, which are then fired to 3.9 or greater specific gravity.

EXAMPLE III

Illustrates usefulness of the invention as an abrasive and sintering to 99% density.

Eight (8) mixtures were prepared and extruded as in II. After drying at 80° C. the extrudate was impact crushed and fired (sintered) in a rotary electric kiln (SiC tube) under various conditions. The resultant grain was sized to 50 grit (Coated Abrasive Manufacturers Institute Standard) and evaluated as an abrasive on coated disc. The results are shown below:

| Test | Sintering Temp. °C. | Time Min. | Density (g/cm)$^3$ | Hardness (GPa) | CAD Results 1020 | % of Result Using Co-fused Alumina-Zirconia |
| --- | --- | --- | --- | --- | --- | --- |
| 1 | 1350 | 5 | 3.84 | 19.9 | 120 | 88 |
| 2 | 1350 | 10 | 3.89 | 19.9 | 100 | 82 |
| 3 | -1350 | 30 | 3.94 | 19.9 | 80 | 68 |
| 4 | 1350 | 60 | 3.95 | 19.1 | 80 | 54 |
| 5 | 1400 | 5 | 3.91 | 19.9 | 93 | 78 |
| 6 | 1400 | 10 | 3.94 | 19.1 | 76 | 67 |
| 7 | 1400 | 30 | 3.97 | 18.5 | 74 | 47 |

In this particular example, best grinding performance was obtained at relatively lower densities. This is so because at the higher densities, exaggerated grain growth has become a deleterious factor fracture characteristics of the material. This does not mean that in general better grinding will occur with lower density.

The data indicates that the gel can sinter to near theoretical density under relatively mild conditions.

The comparison abrasive, co-fused alumina zirconia, is the best prior art fused abrasive material for use in coated abrasives. The results reported in the table refer to the weight of material removed before failure from (1) a 1020 steel speciman as a % of the weight removed by an alumina-zirconia coated disc, and (2) the weight of stainless removed by the test abrasive as a % of that removed by the alumina-zirconia abrasive, under identical test conditions.

I claim:

1. A method for making ceramic bodies comprising polycrystalline alpha alumina comprising the steps of: gelling a mixture including hydrated alumina powder, water and acid, said mixture having a solids content of more than 30% by weight, by extruding said mixture while exerting pressure thereon, said mixture immediately prior to extrusion containing ungelled agglomerates of unpeptized alumina powder, said extrusion acting to force the water and acid into contact with such ungelled alumina powder to provide a substantially homogeneous gelled product; drying said gelled product; firing the dried product to a temperature of less than 1500° C. to convert at least a portion of said hydrated alumina to alpha alumina, said body having a density of at least 90% of theoretical; and providing in said gelled product prior to said firing step submicron sized alpha alumina particles or equivalent nucleation centers as seed material in an amount of between about 0.1% and 5% by weight of the hydrated alumina solids content of the mixture.

2. The method of claim 1 wherein said seed material includes submicron size alpha alumina particles.

3. The method of claim 2 wherein the amount of said seed material present is 5% or less of the total content of said mixture.

4. The method of claim 1 wherein the temperature of firing is 1400° C. or less.

5. The method of claim 1 wherein the solids content of said mixture is at least 50% by weight.

6. The method as in any one of claims 1 to 3 wherein the solids content of said mixture is between 45% and 75% by weight.

7. The method of claim 6 further including the steps of hydrothermally treating said mixture prior to said gelling step.

8. The method of claim 6 wherein said pressure forces said mixture through an extrusion die.

9. The method of claim 1 wherein the solids content is between 45% and 65% by weight and said pressure is between 20 lbs. and 20 tons per square inch.

10. The method of claim 6 further including the step of crushing or breaking up the dried product prior to the firing step to form abrasive grits upon firing.

11. A method for making abrasive grits comprising the steps of:
    (a) forming a mixture including hydrated alumina powder, water and acid, said mixture having a solids content of more than 30% by weight;
    (b) gelling said mixture by extruding said mixture under pressure through a die to obtain substantially homogeneous gelled extruded rods, said mixture immediately prior to such extrusion containing ungelled agglomerates of unpeptized alumina powder, said extrusion acting to force the water and acid into contact with said unpeptized alumina powder;
    (c) drying said rods;
    (d) firing said rods at a temperature of less than 1500° to convert at least a portion of said hydrated alumina to alpha alumina to alpha alumina having crystal sizes of less than 1 micron; and
    (e) providing in said rods prior to said firing step submicron alpha alumina particles or equivalent nucleation centers as seed material in an amount of between about 0.1% and 5% by weight of the hydrated alumina solids content of the mixture.

12. The method of claim 11 wherein said mixture has a solids content of between 45% to 75%.

13. The method of claim 11 wherein said grits have a density of at least about 97% of theoretical.

14. The method of claims 11, 12 or 13 wherein said seed material constitutes 5% or less of the total solids of said mixture.

15. The method of claims 11, or 13 further including the step of breaking up said rods prior to firing.

16. The method of claims 11, 12 or 13 in which said seed material includes submicron sized alpha alumina particles.

* * * * *